Figure 2:
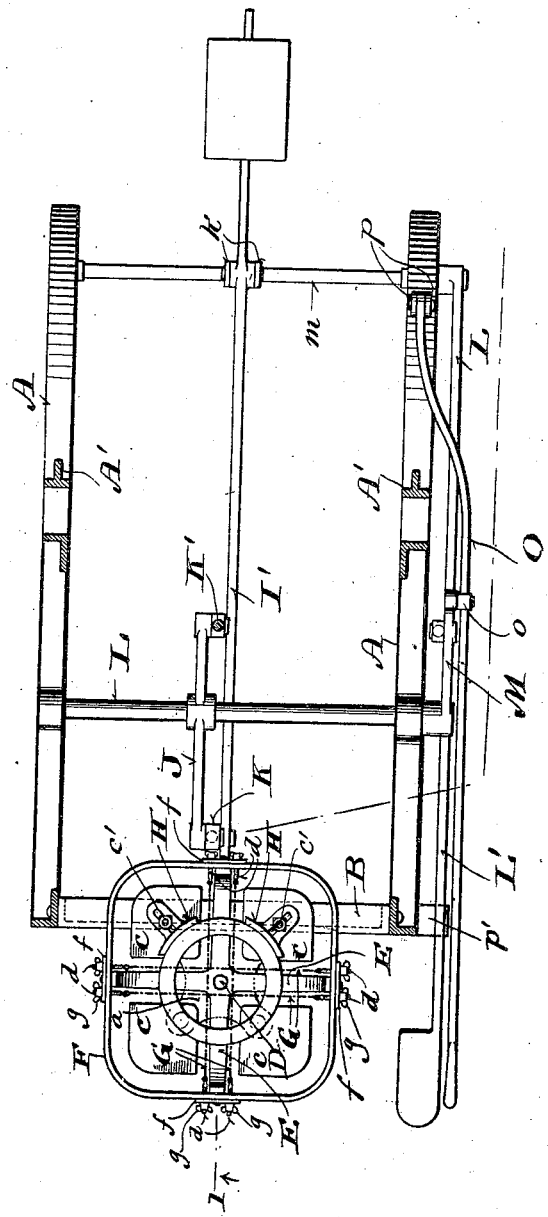

No. 877,151. PATENTED JAN. 21, 1908.
G. P. WILLETT.
MACHINE FOR SLITTING PLASTIC TUBES.
APPLICATION FILED JUNE 10, 1907.
3 SHEETS—SHEET 1.
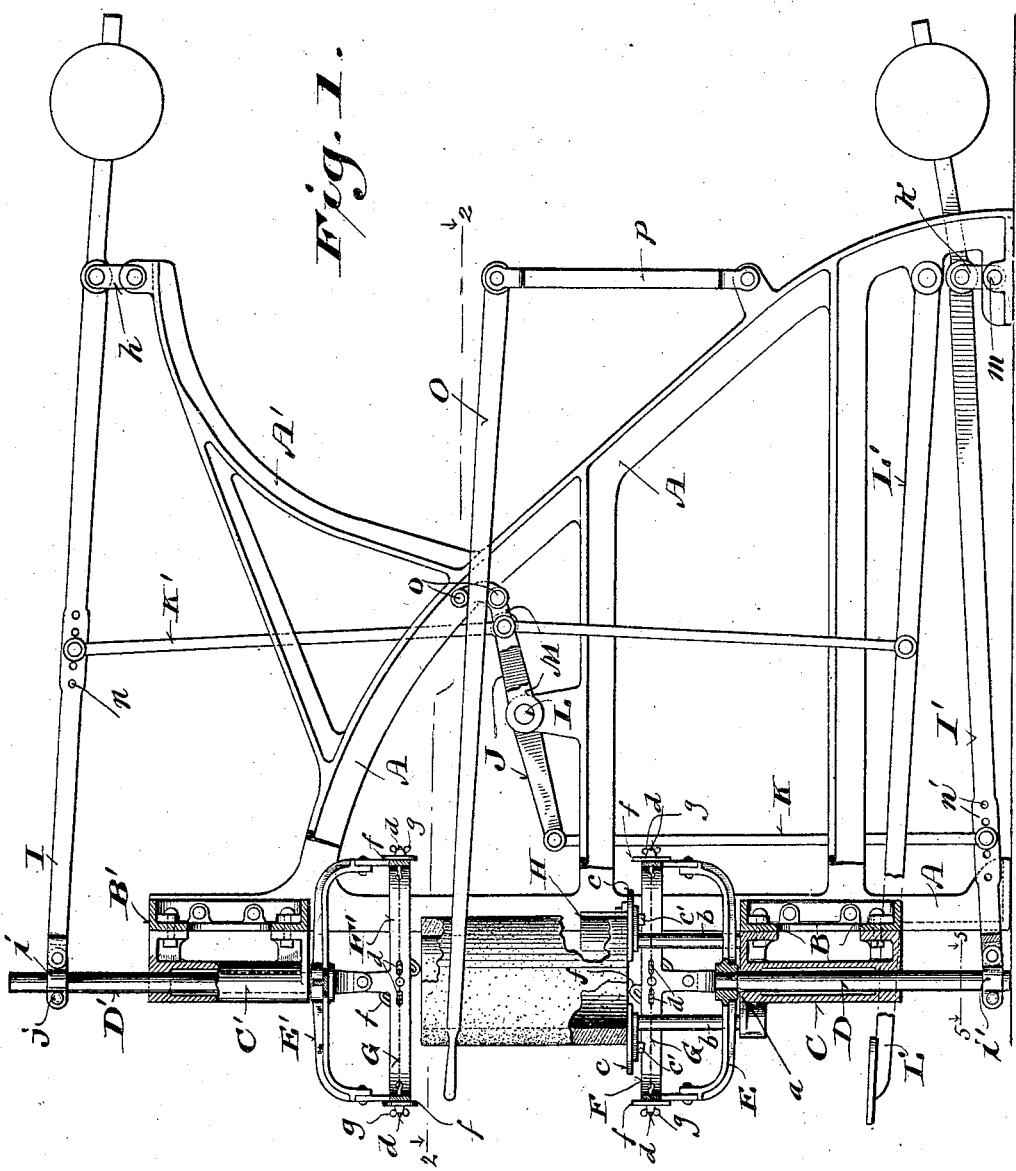
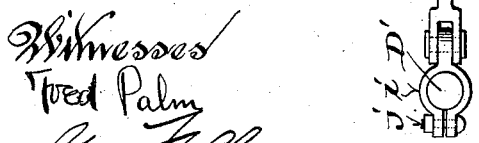

No. 877,151. PATENTED JAN. 21, 1908.
G. P. WILLETT.
MACHINE FOR SLITTING PLASTIC TUBES.
APPLICATION FILED JUNE 10, 1907.

3 SHEETS—SHEET 2.

Witnesses:
Fred Palm
George Felber

Inventor:
George P. Willett
By Oliphant & Young
Attorneys

No. 877,151. PATENTED JAN. 21, 1908.
G. P. WILLETT.
MACHINE FOR SLITTING PLASTIC TUBES.
APPLICATION FILED JUNE 10, 1907.
3 SHEETS—SHEET 3.
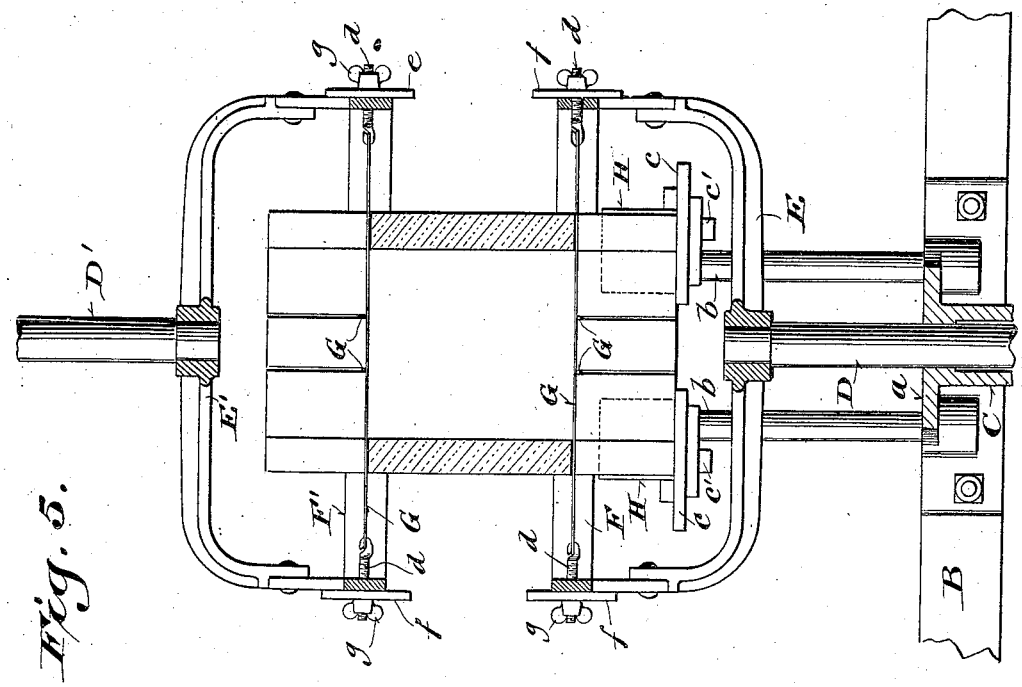
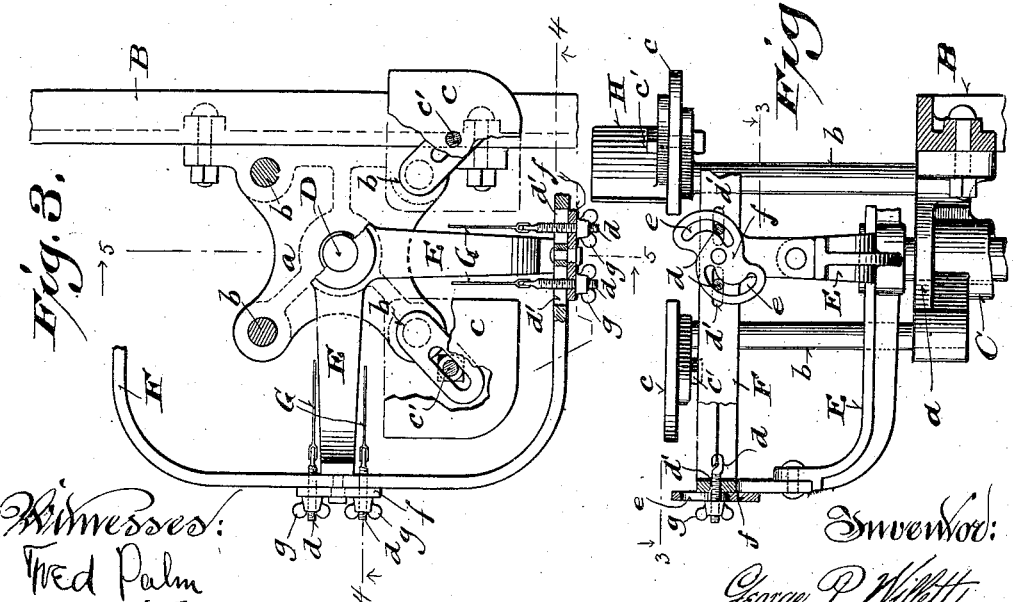

UNITED STATES PATENT OFFICE.

GEORGE P. WILLETT, OF BRISTOL, WISCONSIN.

MACHINE FOR SLITTING PLASTIC TUBES.

No. 877,151.   Specification of Letters Patent.   Patented Jan. 21, 1908.

Application filed June 10, 1907. Serial No. 378,103.

*To all whom it may concern:*

Be it known that, I GEORGE P. WILLETT, a citizen of the United States, and resident of Bristol, in the county of Kenosha and State of Wisconsin, have invented certain new and useful Improvements in Machines for Slitting Plastic Tubes; and I do hereby declare that the following is a full, clear, and exact description thereof.
The object of my invention is to provide a simple, economical and effective machine for longitudinally slitting plastic building tubes while the same are in a green state, said machine being particularly designed for the purpose of facilitating rapid manufacture of building tubes, such as described in Patent No. 834,950, dated November 6, 1906. In the above mentioned patent, the tubes or hollow-sections are longitudinally slotted at either end for approximately one-quarter of their length. In the manufacture these slots are formed by cutting the tubes longitudinally to the depth of the slots, by thin parallel blades or wires spaced apart, the material between the cuts being allowed to remain intact until such time as the tubes are used, when the same is broken out, thus forming a slot, the width of which is determined by the distance between the parallel cutters. The slots thus made are utilized as interlocking members between tiers of tiles built one upon the other.

The invention therefore consists in certain peculiarities of construction and combination of parts as hereinafter fully set forth with reference to the accompanying drawings and subsequently claimed.

In the drawings: Figure 1 represents an elevation of a slitting machine embodying the features of my invention, with a building-tube in position thereon, the view being partly broken away and partly in section, as indicated by line 1—1 of Fig. 2; Fig. 2, a sectional plan view of the same, as indicated by line 2—2 of Fig. 1; Fig. 3, an enlarged detail plan view of the head portion of the machine, with parts broken away and parts in section, as indicated by line 3—3 of Fig. 4; Fig. 4, a sectional elevation of the same, as indicated by line 4—4 of Fig. 3; Fig. 5, an enlarged sectional front elevation of the head showing a building tube in position with the slitting heads closed down upon the same, having just completed a cutting operation, the section being indicated by line 5—5 of Fig. 3, and Fig. 6, a detail plan view of an adjustable lever connection.

Referring by letter to the drawings, A indicates a frame provided with upper and lower cross girders B, B', to which girders are bolted web-extensions of alined sleeves C, C', the upper web-extension $a$ of sleeve C being fitted with four standards $b$ for the support of a like number of table plates $c$ secured to the ends of the standards, the said table-plates together constituting a supporting-table for the tubes. The standards have slotted feet that radiate from the sleeve center on which feet the table-plates are adjustably secured by bolts $c'$, said adjustment being provided to accommodate tubes of different cross-sectional areas, which tubes are supported upon the plates while being cut. Mounted in the sleeves C, C', are reciprocative stems D, D', to which are secured spiders E, E' above and below the respective sleeves. These spiders support bands F, F', which carry two pairs of parallel cutting-wires G, the pairs of wires of each band being arranged to cross each other at right angles and being approximately upon the same plane. In order to adjust the pairs of wires for different widths of cut and also regulate the tension of the same, each wire is provided with a threaded spindle $d$ at its end having a kerfed head, in which kerfs said wire ends are looped. The spindles of each wire pass through slots $d'$ in the band, together with tangential slots $e$ of buttons $f$, said spindles being held in position by thumb-nuts $g$ engaging the outer faces of the buttons. The said buttons are pivoted to the bands F and are each provided with a pair of tangential slots similar to the ones mentioned, for the two wires constituting a pair, the slots being diametrically opposite. By the above described wire retaining mechanism, it will be seen that each wire may be adjusted separately as to tension, and by revolving the buttons, the width between the several pairs of wires may be varied, it being understood that the bands, stems and wires, constituting the upper and lower cutting heads are similar.

When the machine is at rest the lower cutting head is below the table-plates and the upper head a sufficient distance above said plates to permit a tube being readily placed in position upon the aforesaid plates for cutting. In this position, when the lower head is raised, the cutting-wires thereof pass upward through the space between the table-plates, the said plates being separated for this purpose, the rear two of which plates are provided with adjustable gages H, that are held in place by slotted feet-extensions engaging the retaining bolts $c'$ of the aforesaid plates.

Fulcrumed to arms A' of the frame, by means of links $h$, is a counter-balanced lever I, which lever is connected to the cutting-head stem D' by an adjustable split-clip $i$, the same being held by frictional contact to the stem by a bolt $j$. The lever I is adjustably connected to the stem in order that the cutting-head may be raised or lowered to accommodate the machine for different heights of tubes. A counter-balanced lever I' is fulcrumed to the rearward legs of frame A by suitable links $k$, which links are pivoted to a rod $m$ connecting the frame-legs. This lever is connected at its forward end to the lower cutting-head stem D by means of a split-clip $i'$, similar to the clip previously described. The levers I, I' are connected to opposite ends of a walking-beam J, by rods K, K', the rods being adjustable in series of holes $n$, $n'$, in each of said levers by means of which adjustment, the stroke of the aforesaid levers is regulated, in order to control the depth of cut of the slits in tubes of different lengths. The walking-beam is fast on a rock-shaft L that is mounted in bearings in the frame, one end of which shaft extends through its bearing and carries an arm M, which is in link-connection with a foot-treadle L', the latter being fulcrumed in said frame, to which frame a stop-block $p'$ is attached to limit the downward motion of the treadle. The arm M also carries a pair of anti-friction rollers $o$, between which rests a hand-lever O that is fulcrumed in a link $p$, which in turn is pivoted to the machine-frame. This lever together with the foot-treadle and its connections constitutes a lever-system that is practically balanced, and by means of which an operator can readily manipulate the cutting-heads to perform their work, it being understood that the hand-lever is used in conjunction with the foot-power if necessary.

In slitting tubes the operator places a tube upon the table, the tube being centered by means of the gages, and when power is applied to the lever-system, either through the foot-treadle, hand-lever or both, it will cause the cutting-heads to draw together until the same are stopped by the foot-treadle coming in contact with the stop-block $p'$, at which time the wires have cut into the tube the desired depth and the operation has been completed.

While I have shown a system of levers arranged to be manually operated, it is understood that if desired, other power may be utilized and the lever-system varied to suit conditions. In some instances I may substitute springs as a counter-balance for the lever in place of the weights shown in the drawings, and also substitute any suitable adjustment for regulating the widths between the pairs of cutting-wires in accordance with well known mechanics, the essential feature of the invention being the oppositely disposed axial aligned heads carrying pairs of cross-cutters and arranged to reciprocate simultaneously in opposite directions.

I claim:

1. A machine for slitting plastic tubes, comprising a work-supporting table, a pair of reciprocative heads in axial alinement with each other above and below the table, and parallel crossed-wires arranged in pairs carried by the heads.

2. A machine for slitting plastic tubes comprising a work-supporting table, a pair of reciprocative heads in axial alinement with each other above and below the table, and parallel crossed-cutters arranged in pairs carried by the head.

3. In a machine for slitting plastic tubes, a work-supporting table comprising a plurality of plates, gages carried by the plates, a pair of reciprocative heads in alinement with each other above and below the table, and parallel crossed-wires arranged in pairs carried by the heads.

4. In a machine for slitting plastic tubes, a work-supporting table comprising a plurality of adjustable plates, gages carried by the plates, a pair of heads in axial alinement with each other above and below the table, guides for the heads, parallel crossed-wires arranged in pairs carried by said heads, means for adjusting the width between the pairs of crossed-wires, levers in connection with the aforesaid heads, and rods in connection with the levers, whereby the heads are reciprocated.

5. A machine for slitting plastic tubes, comprising a frame, sleeves in axial alinement carried by the frame, stems in the sleeves, heads carried by the stems, parallel crossed-wires arranged in pairs carried by the heads, a work-supporting table in connection with said frame, balanced levers in connection with the stems, a walking-beam mounted in the aforesaid frame, and rods connecting the walking-beam with the balanced levers.

6. A machine for slitting plastic tubes, comprising a frame, sleeves in axial alinement carried by the frame, stems in the sleeves, heads carried by the stems, parallel crossed-wires arranged in pairs carried by the heads, a work-supporting table in connection with said frame, balanced levers in connection with the stems, a rock-shaft carried by the frame, a walking-beam secured to the rock-shaft, rods connecting the walking-beam ends and balanced levers, an arm secured to the rock-shaft, and an operating lever in connection with the arm.

In testimony that I claim the foregoing I have hereunto set my hand at Bristol in the county of Kenosha and State of Wisconsin in the presence of two witnesses

GEORGE P. WILLETT.

Witnesses:
F. R. SNYDER,
GEORGE M. BROWN.